G. A. ANDERSON.
SHOCK ABSORBER.
APPLICATION FILED JUNE 15, 1916.

1,272,178.

Patented July 9, 1918.
3 SHEETS—SHEET 1.

Inventor
Gustaf A. Anderson,
By Bradford Doolittle,
Attorneys

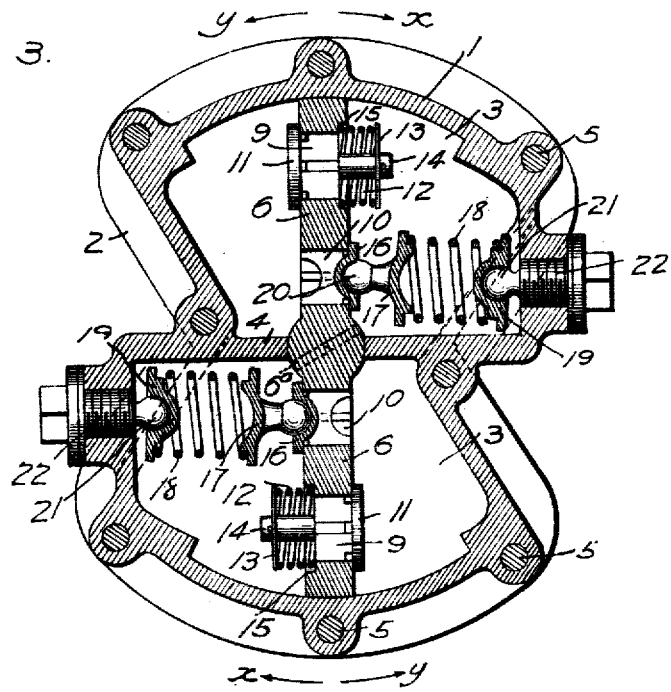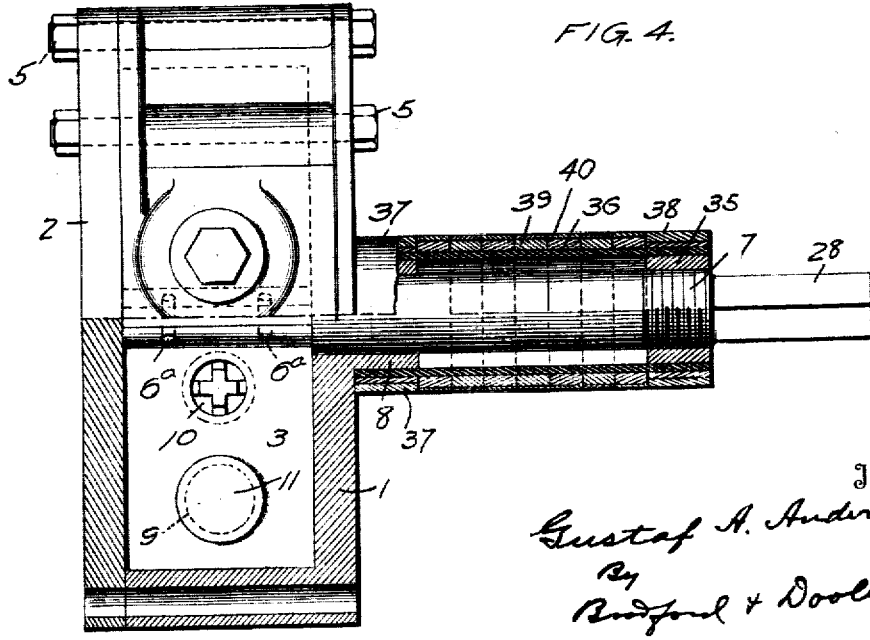

G. A. ANDERSON.
SHOCK ABSORBER.
APPLICATION FILED JUNE 15, 1916.

1,272,178.

Patented July 9, 1918.
3 SHEETS—SHEET 3.

UNITED STATES PATENT OFFICE.

GUSTAF A. ANDERSON, OF WAYNESBORO, PENNSYLVANIA.

SHOCK-ABSORBER.

1,272,178.      Specification of Letters Patent.      Patented July 9, 1918.

Application filed June 15, 1916. Serial No. 103,756.

*To all whom it may concern:*

Be it known that I, GUSTAF A. ANDERSON, a citizen of the United States, residing at Waynesboro, Franklin county, and State of Pennsylvania, have invented and discovered certain new and useful Improvements in Shock-Absorbers, of which the following is a specification.

The present invention relates to energy or shock absorbers and consists in the combinations and arrangements of elements hereinafter described and particularly set forth in the accompanying claims.

The invention has for its purpose to provide a shock absorber of the hydraulic type, adapted particularly for vehicles, in which it is desirable to absorb or diffuse the recoil of the vehicle spring only, and in direct proportion to the degree of compression or velocity of the spring.

A further purpose of the invention is to provide a shock absorber of this character, having a device associated therewith to prevent the oil, or other braking fluid, in the casing chamber from escaping, without the employment of the ordinary packing rings or similar means used for this purpose.

The invention is shown by way of illustration in the accompanying drawings, wherein—

Figure 1:
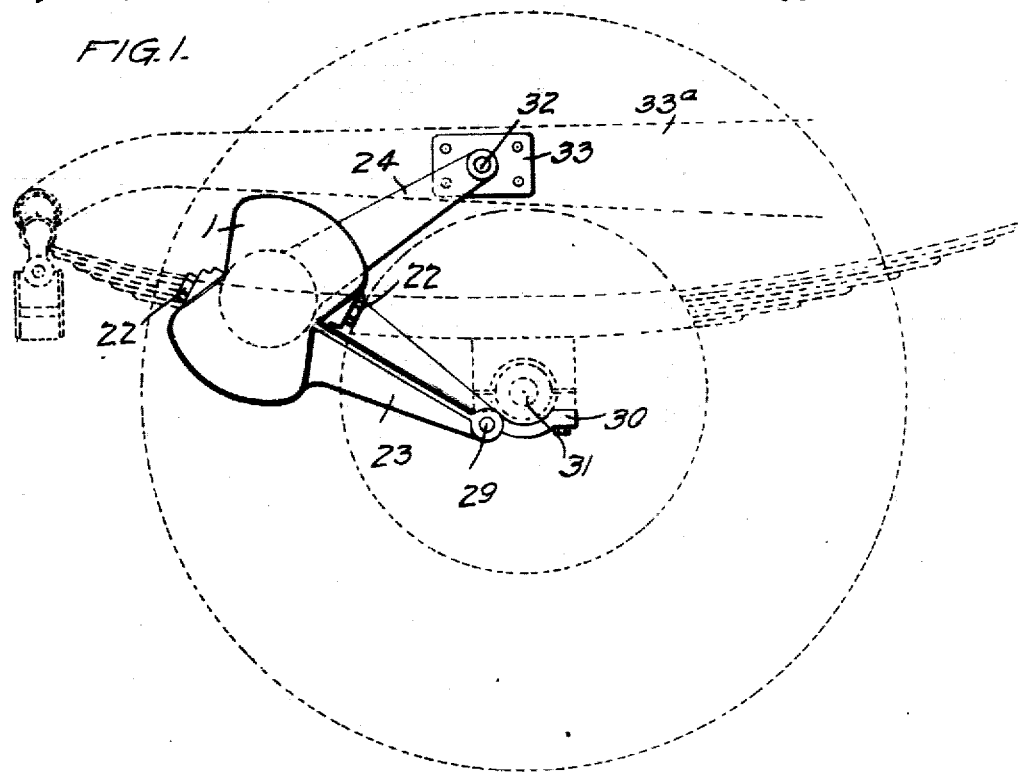
Figure 2:
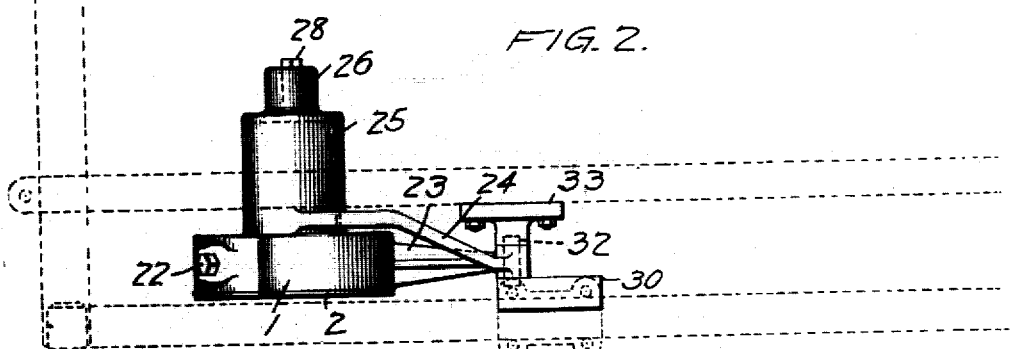
Figure 5:
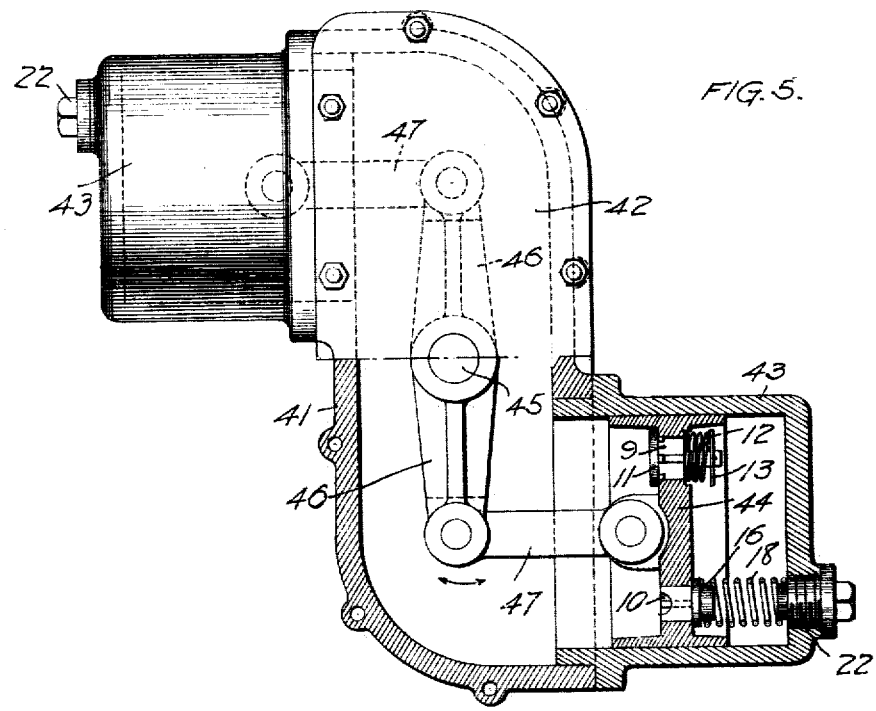
Figure 6:
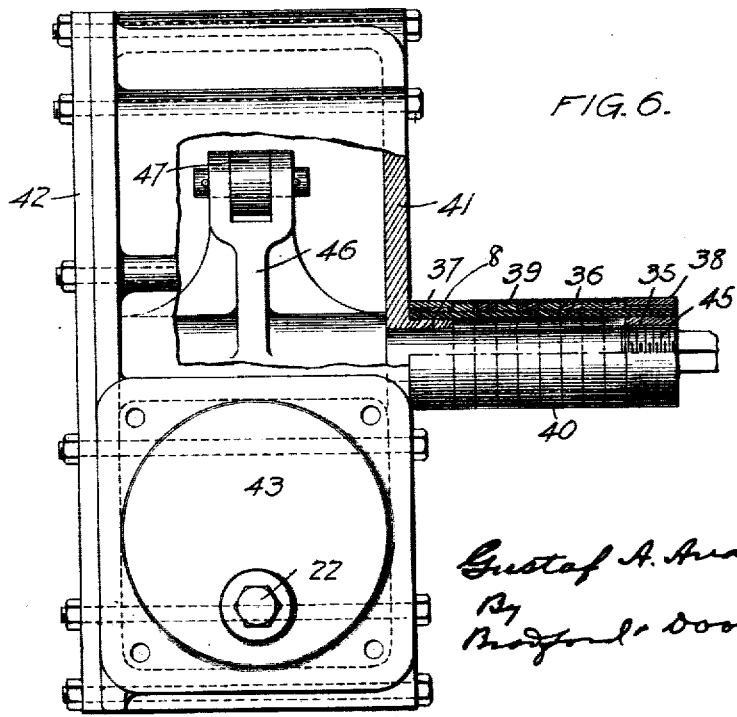

Figure 1 illustrates the shock absorber as applied to a motor car,

Fig. 2 a top plan view thereof,

Fig. 3 a central sectional view of the same,

Fig. 4 a top plan view, partly in section, and showing the braking fluid retaining device, Fig. 5 a side elevational view, partly in section, of a modified construction, and Fig. 6 an end elevational view of the same, partly broken away and in section.

Referring to the construction in further detail, 1 designates a casing having a closure plate 2 and constructed with a pair of segmental chambers 3 that are separated by a transversely disposed wall 4 located centrally of the casing and preferably formed integral therewith. The cover plate 2 is secured to the casing by a plurality of bolts 5, or other suitable means, and forms, with the casing walls, a pair of liquid-tight chambers for the fluid forming the main braking medium.

A double-blade 6, formed with a shaft 7 journaled in the casing extension 8, works within the respective liquid chambers, and since the two blade members are constructed identically and work in the same manner, a description of only one will suffice.

The blade is provided with a pair of by-passes 9 and 10. A valve 11 is mounted on the blade to close the by-pass, and is held normally seated under a slight pressure exerted by a spring 12 that bears against a disk 13 on the valve stem 14 and the countersunk face 15 in the blade, respectively. A valve 16 is seated on the blade to normally close the by-pass 10 and is retained in position by a follower 17 under tension of the spring 18, which, in turn, seats against a head 19. The follower 17 is formed with a stud having a spherical head 20 engaging in a depressed face formed in the valve 16; and the head 19 is constructed to receive the spherical head 21 of the bolt 22 screw-threaded on the casing and seating the valve. This manner of seating the valve and holding the same under tension (*i. e.* by the spherical members 20 and 21) insures the positive positioning of the valve 16 under the oscillations of the blade when the latter is subjected to such sudden and irregular movements as would be encountered in the normal working of the device.

The device is adapted to be mounted on the relatively movable parts, whose motions it controls, by means of the pair of arms 23 and 24 connected, respectively to the casing 1 and a sleeve or cover 25 mounted on the casing extension 8 and having a reduced and squared apertured portion 26 engaging with the squared end 28 of the shaft 7. In the present instance, the arm 23 pivotally engages a pin 29 on the plate 30 that is secured to the axle 31 of the vehicle; and said arm 24 has pivotal engagement with the pin 32 on the plate 33 that is suitably mounted on the frame 33ᵃ of the car.

In the operation of my invention the arms 23 and 24 being pivotally attached respectively to the axle and frame of the vehicle, operate the mechanism contained within the chambers 3 to consume as large a portion as is practical of the energy stored in the unsprung weight by the rebound and at the same time operate with equal efficiency for rebounds of different values and in direct proportion to the value thereof.

During the compression stroke of the vehicle springs, due to the action of an obstacle encountered by the vehicle wheels in motion, the blade 6 is oscillated in the direction indicated by the arrow $x$, thus gradually compressing the springs 18 controlling the throttling valves 16 in proportion to the degree of oscillation of the blade 6 or the compression deflection of the vehicle springs. As oil is practically incompressible and the chambers 3 are filled originally, the valves 11, normally held seated under the soft action of the springs 12, are opened, permitting the free by-passing of the oil from one side of the blade to the other, the valve areas 11 being sufficient not to retard the compression action of the vehicle springs. In this connection it will be noted that the resistance offered by the action of the throttling springs 18 is immaterial as the pressure they exert upon the blades is relatively small and the effect negligible.

The compression stroke of the vehicle springs ended, the deflection thereof being in proportion to the obstacle encountered, the expansion stroke begins and the blade 6 oscillates in the direction indicated by the arrow $y$. The valves 11 are instantly closed preventing the return of the oil previously by-passed therethrough. The blade 6 continues in the direction indicated until the fluid pressure within the chambers 3 equals the load upon the throttling valves 16, determined by the degree of deflection of the vehicle springs. It is this pressure on the blade area that forms the basis for the resistance offered by the absorber during the expansion or recoil of the deflected vehicle spring.

Now that this resistance to vehicle spring recoil shall at all times be in direct proportion to the deflection thereof it must be understood that as the vehicle springs are deflected or compressed the springs 18 are also continually compressed and as the vehicle springs recoil or expand the springs 18 continually expand, thereby varying continually the value of resistance within the chambers 3 to the vehicle spring recoil. The two liquid chambers are adapted to communicate for insuring uniform pressure therein, by means of the channel-ways $6^a$ formed in the fulcrum portion of the blades and connecting the chamber divisions in diagonal pairs (see Fig. 3).

In an apparatus of this kind, a small loss of fluid greatly lowers the efficiency of its operation and, on account of the comparatively small volume of liquid contained in the casing, a slight leak will soon produce disastrous results and obviously defeat the purpose for which the device is intended.

Stuffing boxes are not dependable for curing this fault, and it is therefore proposed to provide an attachment for the device which will effectually prevent any leakage of the liquid and, at the same time, not interfere with the operation. To this end the casing 1 has the tubular extension 8 and a collar 35 screw-threaded on the shaft 7, and with said extension the collar supports and spaces from the shaft a tubular section 36, of rubber or other suitable flexible material. The tubular section 36 is secured to the members 8 and 35 by the pair of clamping rings 37 and 38, of ordinary form, and a protecting structure for the tube is mounted therein between said clamping rings. The protecting means consists of a plurality of rings 39, of leather, wood, or other suitable filling material, that are fitted directly over the tube 36 and arranged end to end, as shown. A series of metal rings 40 overlie the rings 39 and are assembled in close arrangement thereon and to have relative angular movement. It will be understood that the chamber provided by the rubber tubing is filled with oil at all times and from which it cannot escape to the outside by reason of the liquid-tight joint provided by the clamping ring 38, and it will be further noted that the tube will not, in any wise, be mutilated by reason of its torsional strains due to the relative movement of the casing and shaft, inasmuch as the length of the tube will allow of this twisting.

In the arrangement shown in Figs. 5 and 6, the casing is constructed of a main body portion 41, closed by a side plate 42, and fitted at its opposite ends with a pair of oppositely disposed cylinders 43 having closed ends. In each of said cylinders there is mounted a piston 44 having fluid by-passes 9 and 10 that are normally closed by the valves 11 and 16 mounted on the piston, and on the piston and cylinder head, respectively, in the manner shown. The two pistons 44 are connected to the shaft 45 by a two-armed lever 46 mounted on said shaft and engaging respectively with the piston rods 47 connected to the pistons.

This construction of the energy or shock absorber is likewise provided with a leak stopping device formed as an extension on the shaft, and in operation the working principle is the same as that already described with reference to the form of device shown in the preferred type.

It is obvious that those skilled in the art may vary the details of construction and arrangement of parts without departing from the spirit of the invention, and therefore I do not wish to be limited to such features except as may be required by the claims.

Having thus fully described my said invention, what I claim as new and desire to secure by Letters Patent, is:

1. In an energy absorber, the combination of a casing providing a liquid chamber, a blade mounted to oscillate in said chamber and constructed with by-passes therethrough, valves mounted in said by-passes, one of said valves operating to by-pass fluid in one direction and the other in the opposite direction, and a spring mounted in said chamber to bear at one end against a wall of said chamber and at the other end against one of said valves, substantially as set forth.

2. In an energy absorber the combination of a casing providing a chamber, a blade mounted to oscillate therein and constructed with a by-pass, a valve mounted in said by-pass, and means interposed between said blade and casing operable by the oscillation of said blade for increasing or diminishing the load on said valve, substantially as set forth.

3. In an energy absorber the combination of a casing providing a fluid chamber, a member operable within said chamber and formed with a by-pass therethrough, a valve at said by-pass, and means interposed between said valve and the casing for controlling said by-pass in proportion to the relative relation of said member and chamber, substantially as set forth.

4. In an energy absorber the combination of a casing providing a liquid chamber, a member operable within said chamber and formed with a by-pass, a valve at said by-pass, and a spring interposed between said casing and said valve for controlling said by-pass, substantially as set forth.

5. In an energy absorber the combination of a casing providing a liquid chamber, a piston mounted to have a relative movement in said chamber, and provided with by-passes, valves for controlling said by-passes, and means abutting the casing associated with part of said valves and operable by the movement of said piston in relation to said casing for controlling said part of said valves, substantially as set forth.

6. In an energy absorber the combination of a casing providing a liquid chamber, a blade mounted to oscillate in said chamber and constructed with a by-pass, a spring seated valve mounted on the blade normally closing said by-pass, a second by-pass formed in the blade adjacent the fulcrum thereof, and a spring seated valve mounted on said blade and the casing and normally closing said by-pass, said first named valve operable to effect free by-passing of the fluid when the blade moves in one direction and the second named valve only operable to effect a braking action by fluid throttling when the blade moves in the other direction, substantially as set forth.

7. In an energy absorber the combination of a casing providing liquid chambers, blades mounted to oscillate in said chambers respectively and each constructed with by-passes, valves normally closing said by-passes respectively, springs seating against certain of said valves and the casing respectively and said valves coöperable in pairs to effect free by-passing of the fluid when the blades move in one direction, and a pair of said valves operable to effect a braking action by fluid throttling when the blades move in the opposite direction, substantially as set forth.

8. In an energy absorber the combination of a casing providing liquid chambers, blades mounted to oscillate in said chambers and each constructed with two by-passes, a pair of spring seated valves mounted on said blades respectively and normally closing the by-passes, and a second pair of valves mounted on said blades spring seated against the blades and the casing and normally closing the other pair of said by-passes, said first named pair of valves operable to effect free by-passing of the fluid when the blades move in one direction, and the second named pair of valves only effecting a braking action by fluid throttling when the blades move in the other direction, substantially as set forth.

9. In an energy absorber the combination of a casing providing liquid chambers, blades mounted to oscillate in said chambers and each constructed with an inner and an outer by-pass, the outer pair of said by-passes being of relatively greater cross-sectional area than the inner pair of by-passes, a pair of spring seated valves mounted on said blades and normally closing the outer pair of said by-passes, a second pair of valves mounted on said blades and normally closing the inner pair of said by-passes and springs seating against said inner pair of valves and the casing, said outer pair of valves freely by-passing the fluid when the blades move in one direction, and the inner pair of said valves effecting a braking action by fluid throttling when the blades move in the other direction, substantially as set forth.

10. In an energy absorber the combination of a cylinder providing a liquid chamber, a piston mounted to reciprocate in said chamber and constructed with by-passes, and spring seated valves normally closing said by-passes, said valves' springs seating against the cylinder and the piston respectively, one of said valves operable to effect free by-passing when the piston moves in one direction and only one of said valves effecting a braking action by fluid throttling when the piston moves in the other direction, substantially as set forth.

11. In an energy absorber the combination of a pair of opposed cylinders providing communicating liquid chambers, pistons mounted to reciprocate in said cylinders respectively and each constructed with two by-passes, a pair of spring seated valves mounted on said pistons respectively and normally closing a pair of said by-passes, a second pair of valves mounted on said pistons and normally closing the other pair of said by-passes and springs seating against the second pair of valves and the casing, said first named pair of valves operable to effect free by-passing of the fluid when the pistons move in one direction, and the second pair of said valves operable to effect a braking action by fluid throttling when the pistons move in the other direction, substantially as set forth.

12. The combination with an energy absorber comprising parts having relative angular movement and working with a liquid, of members mounted on said parts respectively, a flexible tubular body mounted on said members respectively and subject to torsional strains, said tubular body providing an annular chamber adapted to liquid, and a protecting structure for the tubular body, substantially as set forth.

13. The combination with an energy absorber comprising parts having relative angular movement and working with a liquid, of members mounted on said parts respectively, a flexible tubular body mounted on said members respectively and subject to torsional strains, said tubular body providing an annular chamber adapted to liquid, rings securing said tubular body on said members, and a plurality of rings providing a protecting structure for the tubular body intermediate said securing rings, substantially as set forth.

14. The combination with an energy absorber comprising parts having angular movement and working with a liquid, of members mounted on said parts respectively, a flexible tubular body mounted on said members respectively and subject to torsional strains, said tubular body providing an annular chamber adapted to liquid, a pair of clamping rings securing said tubular body at either end thereof to said members, a plurality of rings mounted on said tubular body intermediate said clamping rings providing a filler, and a protecting structure comprising metal rings mounted on said filler body, substantially as set forth.

15. The combination with an energy absorber comprising parts having relative angular movement and working with a liquid, of a tubular and shaft projection mounted on said parts respectively, a collar mounted on said shaft projection, a flexible tubular body mounted on said tubular member and collar respectively and subject to torsional strains, said tubular body providing an annular chamber adapted to liquid, and a projecting structure for the tubular body, substantially as set forth.

16. The combination with an energy absorber comprising parts having relative angular movement and working with a liquid, of a tubular and shaft projection mounted on said parts respectively, a collar mounted on said shaft projection, a flexible tubular body mounted on said tubular member and collar respectively and subject to torsional strains, said tubular body providing an annular chamber adapted to liquid, clamping rings securing said flexible tubular body to said collar and tubular extension, ring sections mounted on said flexible tubular body between said clamping rings and providing a filler, and metallic ring sections mounted on said filler ring sections providing a protecting structure, substantially as set forth.

In witness whereof, I have hereunto set my hand and seal at Washington, District of Columbia, this seventh day of June, A. D. nineteen hundred and sixteen.

GUSTAF A. ANDERSON. [L. S.]

Witnesses:
E. W. BRADFORD,
E. S. CLEMENTS.